United States Patent Office 2,972,509
Patented Feb. 21, 1961

2,972,509

COMPOSITIONS AND METHODS FOR DYEING POLYESTER MATERIALS

Edward S. Olson, Clemson, S.C., assignor to Deering Milliken Research Corporation, Pendleton, S.C., a corporation of Delaware No Drawing. Filed July 28, 1958, Ser. No. 751,139

17 Claims. (Cl. 8—55)

This invention relates to the dyeing of polyester fibers and more particularly the invention relates to novel dye assistants suitable for use in the dyeing of polyester fibers, methods for preparing the same, and to dyeing procedures employing the new dye assistants. This application is a continuation-in-part of application S.N. 420,185, filed March 31, 1954, now abandoned.

Polyester fibers, or fabrics containing the same, are customarily dyed with dispersed acetate dyes or with similar dyes especially developed for the polyester fibers. Under some conditions these dyestuffs are capable of dyeing without a chemical assistant but in most instances, and in particular when dyeing heavy shades, a chemical dyeing assistant or carrier is generally considered to be advantageous.

It is well known that among the many chemical compounds capable of acting as assistants for the dyeing of polyester materials, the phenylphenols are among the most efficient. The phenylphenols as dye assistants for polyester fibers, however, suffer the disadvantage that it is extremely difficult to prepare a suitable emulsion of such phenolic compounds in the dye bath. Early efforts to prepare a suitable emulsion of the phenylphenols by dissolving the phenolic compounds in an organic solvent and then diluting the resulting organic solution were largely unsuccessful since, when the organic solution was added to water, a stable emulsion could not be formed. As a result, a procedure was evolved wherein the phenylphenol is first converted to a water soluble metallic salt, the salt dissolved in the dye bath, and an acid or acidic salt then added to slowly liberate the free phenylphenol. A weak acid or weakly acidic salt is preferable since, if one adds a strong acid to the dye bath, the phenylphenol is liberated very rapidly and under these conditions a suitable emulsion may not be formed.

It can be seen that the procedure of converting the phenylphenol to a salt and thereafter slowly converting the salt back to the free phenol in the dye bath has several disadvantages. A primary disadvantage of this procedure is that it limits one as to the pH of the dye bath. As is well known, many dyestuffs are most effective within a limited pH range depending on the individual characteristics of the specific dyestuffs and a procedure which rigidly limits the pH of the dye bath also limits the selection of dyestuffs that can be employed most effectively. A further disadvantage of the phenylphenol salt procedure is that it requires a chemical modification of the phenol which, of course, adds to the expense of dyeing polyester fibers. A still further disadvantage of the phenylphenol salt procedure is that the emulsion must be prepared during the actual dyeing operation since it is unstable and cannot be prepared in advance.

It has now been found that by the procedure of this invention aqueous emulsions of the phenylphenols, stable at practically any desired pH, can be prepared and that the resulting emulsions are suitable for addition to a dye bath as carriers in the dyeing of polyester fibers or fabrics.

According to this invention, a phenylphenol is added to a hydrocarbon, glycol, or glycol ether solvent containing at least about 0.2% and preferably from about 3.5% to 40%, based on the weight of phenol, of an alkylarylsulfonic acid emulsifying agent, and the resulting mixture is heated or allowed to stand until it appears to become a true solution. The organic mixture of solvent, emulsifier and phenol can then be added to water or an aqueous solution of the dye bath with agitation to give a relatively stable oil in water emulsion.

As will be apparent from the above, the new emulsions of this invention have numerous advantages as carriers for the dyeing of polyester fibers. In the first place, the emulsions are stable over considerable periods of time so that several days' supply may be prepared at one time and thereafter be available for immediate use as the situation demands. A further advantage is that emulsions can be prepared which are stable at any desired pH so that one's selection of dyestuffs is not limited and the selected dyes can be readily employed under the most favorable conditions. A still further advantage is that an appreciable reduction in the cost of dyeing can be realized.

While any alkylarylsulfonic acid emulsifying agent can be employed in preparing a dye assistant composition according to this invention, dodecylbenzenesulfonic acid and nonylnaphthalenesulfonic acid have been found to be especially advantageous. One should employ at least about 0.2%, based upon the weight of the phenol to be emulsified, of the emulsifying agent and preferably from 3.5% to 40%.

The invention can be employed with any of the phenylphenols although best results are obtained with ortho-phenylphenol and meta-phenylphenol. Since ortho-phenylphenol is more readily available than meta-phenylphenol it constitutes the preferred species.

Substantially any hydrocarbon, glycol, or glycol ether known to be a satisfactory solvent for the phenylphenols and for the selected emulsifying agent is satisfactory for the preparation of the new dye assistants of this invention. The aromatic hydrocarbon solvents as illustrated by toluene and xylene have been found to be quite satisfactory and since they are readily available are preferred. Other solvents which can be employed include the aliphatic hydrocarbon solvents, glycol solvents, as illustrated by propylene glycol, glycol ether solvents as illustrated by 2-ethoxyethanol and, in instances where the emulsifying agent is a liquid, e.g., dodecylbenzenesulfonic acid, an excess of the emulsifying agent can act as the solvent. It should be emphasized at this point that if one is employing an emulsifying agent which is most effective in the form of a water soluble salt, it is not necessary that the solvent be capable of dissolving the salt as such since the free acid can be employed to form the phenol solution and thereafter, to enable one to more readily form a suitable emulsion, the solution can be at least partially neutralized, before additional water is added, with aqueous ammonium hydroxide, sodium hydroxide or any other base capable of forming a water soluble salt with the free acid. The amount of the solvent employed can be varied within wide limits as long as one employs a sufficient quantity to dissolve the phenylphenol and the emulsifying agent.

When employing a solvent other than an excess of emulsifying agent, the emulsifying agent should be added to the organic solvent prior to the addition thereto of the phenylphenol and it has been found that more satisfactory results are frequently obtained if the mixture of solvent and emulsifying agent is allowed to stand for about 8 hours or longer before the phenylphenol is added. As an alternative to allowing the mixture of emulsifying agent and solvent to stand for a period of hours the mixture can be warmed slightly, for example to a temperature of at least about 100° F., and stirred to obtain an intimate intermixture of the two materials.

After the phenylphenol has been added to the mixture of solvent and emulsifier, no effort should be made to form an emulsion therefrom until the phenylphenol-emulsifier-solvent mixture shows no evidence of heterogeneity and appears to be a true solution. When the phenylphenol is added to the mixture of solvent and emulsifying agent, there first is formed a cloudy heterogeneous mixture which is obviously not a true solution but upon standing for a period of time, for example from 8 to 48 hours, the mixture becomes fully transparent and is apparently a true solution of the emulsifying agent and the phenol in the solvent employed. As an alternative to allowing the mixture to stand for a period of hours, it can be heated slightly, for example to a temperature of at least 80° F. and preferably to a temperature of at least about 160° F. and with gentle agitation the mixture becomes clear in only a few minutes. Once the mixture shows no evidence of heterogeneity, it can be employed in the formation of an emulsion without difficulty and with a minimum of agitation.

The amount of water to which the organic solution of the phenylphenol and the emulsifying agent is added may be varied within very wide limits and the organic solution can, if desired, be added directly to the dye bath. It will generally be found convenient, however, to add the organic solution of phenol and emulsifier to a small quantity of water, for example from ½ to 5 times the volume of the organic solution, so that agitation can be more readily accomplished. Once a concentrated emulsion of this type has been prepared, it is stable for relatively long periods of time so that one is thereby enabled to prepare a sufficient quantity of the emulsion to satisfy requirements for several weeks. This eliminates the necessity of frequent small scale preparation.

The manipulative procedure for employing the new assistants of this invention in the dyeing of polyester fibers does not differ greatly from that usually employed with conventional assistants. A preferred procedure for employing the new assistants of this invention comprises adding to a dye bath at a temperature of about 110° F. to 170° F., a quantity of the assistant sufficient to provide an amount of phenylphenol equal to from 0.1% to 20% and preferably from 1% to 10% of the weight of the material to be dyed. The preferred temperature for the addition of the assistant is approximately 120° F., and if the temperature of the bath at the time the assistant is added is above about 195° F., some loss of assistant through steam distillation will be encountered unless a closed system is employed. Following the addition of the phenol, the dye bath is preferably maintained at a constant temperature for from about 10 minutes to 1 hour at the end of which time the dyestuff is added and the temperature slowly raised to approximately 180° F. The temperature of the bath is then preferably maintained constant for from about 10 minutes to an hour and the pH of the bath adjusted to be most suitable for the particular dyestuff added. The temperature is then raised to 210° to 250° F. and held at this point until a satisfactory dyeing is obtained.

The dyes which can be employed with the new assistants of this invention are the same as conventionally employed with prior art dye assistants in the dyeing of polyester fibers. Typical examples of suitable dyestuffs which can be employed according ot this invention include the Latyl colors and Celanthrene dyes sold by E. I. du Pont de Nemours & Co., the Amacron dyes sold by American Aniline Products and the Celliton dyes sold by General Dyestuff Corporation.

The invention will now be illustrated by the following specific examples in which all parts are by weight unless otherwise indicated:

*Example I*

In one part by weight of toluene there is dissolved 0.2 part by weight of dodecylbenzenesulfonic acid. The resulting solution is aged at room temperature for 48 hours at the end of which time there is added with stirring one part by weight of ortho-phenylphenol. This solution is also allowed to age 48 hours at room temperature and at the end of such time it is neutralized with aqueous ammonia until the mixture is cream colored. The neutralized mixture is then very slowly added over a period of 5 minutes to an equal weight of water with agitation. The emulsion is allowed to stand for 10–15 minutes and then is again agitated for 15 minutes to produce an emulsion which is stable over a period of one week or more.

*Example II*

To one part of xylene there is added 0.3 part of nonylnaphthalenesulfonic acid and the resulting solution allowed to stand for approximately 24 hours at room temperature. To the solution of emulsifying agent and solvent there is then added, with stirring, one part by weight of meta-phenylphenol and the resulting mixture stored at room temperature for 72 hours. The aged solution is then neutralized with aqueous ammonia and is added to an equal volume of water with agitation over a period of 10–15 minutes. Agitation is continued for an additional 20 minutes to give an emulsion of meta-phenylphenol stable over a period of several days.

*Example III*

A large dye beck is loaded with 350 pounds of close woven material composed of 55% polyethylene glycol-terephthalic acid ester fibers (Dacron) and 45% wool fibers. To place the material in better condition for dyeing, it is first scoured with a detergent solution, then a solution of an enzyme desizing agent (Serizyme), a dilute sulfuric acid solution, and again in a detergent solution. The beck is then filled with water to which there is added 2.0 pounds of wetting agent (Duponol RA) and the bath heated to 160° F. There is then added 32 pounds of the carrier emulsion of Example I and the beck allowed to run 30 minutes. At the end of this time there is added a dye mixture containing 21 pounds Latyl Violet B, 9.5 pounds of Latyl Blue 2G, 1.44 pounds of Celanthrene Yellow GL, 1.25 pounds of Neolan Bordeaux RM, and 1.25 pounds of Nyasol Fast Yellow 2GA. The bath is then held at 180° F. for 30 minutes at the end of which time there is added 5.8 pounds of sulfuric acid and the bath raised to the boil. The bath is held at the boil for 3 hours at the end of which time it is dropped and the material then scoured thoroughly several times. On drying, the material is found to be dyed a level navy blue.

*Example IV*

A large dye beck is loaded with 342 pounds of material composed of 55% polyethylene glycol-terephthalic acid ester fibers (Dacron) and 45% wool fibers. The beck is filled and to the bath there is added 3 pounds of wetting agent (Alkonol DW). The bath is heated to 160° F. and run for 10 minutes at the end of which time there is added 32 pounds of the carrier emulsion of Example II and the bath run an additional 30 minutes at 160° F. There is then added to the bath a dye mixture containing 19.92 pounds of Latyl Violet B, 8.965 pounds of Latyl Blue 2G, 1.19 pounds Celanthrene Yellow GL, 1.495 pounds of Bordeaux RM, and 1.495 pounds of Vitrolan Blue 2G. The temperature of the bath is gradually raised to 180° F. and held at this temperature for 30 minutes at the end of which time there is added 5.8 pounds of sulfuric acid. The temperature of the bath is then raised to 210° F. and the cloth run for 2½ hours. The material is then rinsed and the bath dropped. The beck is again filled and to the bath there is added 4.0 pounds of detergent (Nacconol) and 1.0 pound of soda ash. After 15 minutes at 180° F. the material is rinsed and the bath dropped. The material is then removed from the beck, dried and found to have been dyed a level dark navy blue.

Having thus described my invention and several specific embodiments thereof, what I desire to claim and secure by Letters Patent is:

1. A new composition of matter useful as an assistant in the dyeing of fibers and stable under acidic conditions at dye bath temperatures, said composition comprising an aqueous emulsion of a phenylphenol of the formula:

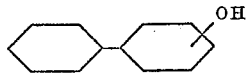

a solvent for said phenol, said solvent comprising a member selected from the group consisting of hydrocarbon solvents, glycol solvents, and glycol ether solvents, and from 3.5% to 40% based on the weight of said phenol, of an alkylarylsulfonic acid emulsifying agent.

2. A composition according to claim 1, wherein said solvent is an aromatic hydrocarbon solvent.

3. A composition according to claim 2, wherein said solvent is toluene.

4. A composition according to claim 1, wherein said phenol is ortho-phenylphenol.

5. A composition according to claim 1, wherein said emulsifying agent is an alkylbenzenesulfonic acid emulsifying agent.

6. A composition according to claim 5, wherein said emulsifying agent is dodecylbenzenesulfonic acid.

7. A new composition of matter useful as an assistant in the dyeing of polyester fibers and stable under acidic conditions at dye bath temperatures, said composition comprising an aqueous emulsion of ortho-phenylphenol, an aromatic hydrocarbon solvent for said phenol, and from 3.5% to 40% based on the weight of said phenol, of an alkylbenzenesulfonic acid emulsifying agent.

8. A composition according to claim 7, wherein said solvent comprises toluene and said emulsifying agent is dodecylbenzenesulfonic acid.

9. A method for preparing an aqueous emulsion suitable for use in the dyeing of polyester fibers, which method comprises adding a phenylphenol of the formula:

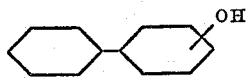

to an organic solvent for the phenylphenol, said solvent comprising a member selected from the group consisting of hydrocarbon solvents and glycol ether solvents, and said solvent containing at least about 0.2%, based on the weight of phenol, of an alkylarylsulfonic acid emulsifying agent, and, after the resulting mixture becomes completely homogeneous, adding the same, with agitation, to water.

10. A method according to claim 9, wherein said phenol is orthophenylphenol.

11. A method according to claim 10, wherein said solvent is an aromatic hydrocarbon solvent and said emulsifying agent is an alkylbenzenesulfonic acid emulsifying agent.

12. A method according to claim 11, wherein said solvent is toluene and said emulsifying agent is dodecylbenzenesulfonic acid.

13. A method according to claim 12, wherein said emulsifying agent is present in a quantity equal to from 3.5% to 40% of the weight of the phenol.

14. A method according to claim 13, wherein the mixture of solvent and emulsifying agent is aged for a period of at least about 8 hours before said phenol is added.

15. A method for dyeing fabrics containing polyethylene glycol-terephthalic acid ester fibers which comprises dispersing in an aqueous dye bath a quantity of an organic solution of a phenylphenol of the formula:

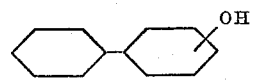

and an alkylarylsulfonic acid dispersing agent in an organic solvent, and thereafter dyeing said fabric therein, said quantity of said organic solution being sufficient to provide from 0.1% to 20% based upon the weight of fabric to be dyed of said phenol.

16. A method for dyeing fabrics containing polyethylene glycol-terephthalic acid ester fibers which comprises forming an aqueous dispersion by mixing together water and a homogeneous solution of an alkylarylsulfonic acid dispersing agent and an unsubstituted phenylphenol in an organic solvent selected from the group consisting of hydrocarbon solvents, glycol solvents and glycol ether solvents, formulating a dye bath containing a quantity of said emulsion sufficient to provide from 0.1% to 20%, based upon the weight of fabric to be dyed, of said phenol, and thereafter dyeing said fabric in said bath.

17. A new composition of matter, useful in the preparation of an improved dye assistant, comprising a homogeneous solution in an organic solvent of an unsubstituted phenylphenol and from 3.5% to 40%, based upon the weight of said phenol, of an alkylarylsulfonic acid emulsifying agent, said organic solvent being selected from the group consisting of hydrocarbon solvents, glycol solvents, and glycol ether solvents.

References Cited in the file of this patent

UNITED STATES PATENTS

| | | |
|---|---|---|
| 2,110,074 | Arnold | Mar. 1, 1938 |
| 2,273,305 | Whitehead | Feb. 17, 1942 |
| 2,616,779 | Hilliard | Nov. 4, 1952 |
| 2,754,171 | Salvin | July 10, 1956 |
| 2,872,279 | Wiseman | Feb. 3, 1959 |
| 2,880,050 | Fortess | Mar. 31, 1959 |

OTHER REFERENCES

Turnbull: Amer. Dyestuff Rep., February 4, 1952, p. 78.

Zimmerman: Amer. Dyestuff Rep., April 25, 1955, pp. 296–302.

Fern: J.S.D.C., December 1955, vol. 71, p. 842.